May 13, 1958 L. DIETCH 2,834,913

TELEVISION DEFLECTION APPARATUS

Filed June 26, 1956 2 Sheets-Sheet 1

INVENTOR.
LEONARD DIETCH
BY
ATTORNEY

INVENTOR.
LEONARD DIETCH
BY
[signature]
ATTORNEY

United States Patent Office 2,834,913

Patented May 13, 1958

2,834,913

TELEVISION DEFLECTION APPARATUS

Leonard Dietch, Haddonfield, N. J., assignor to Radio Corporation of America, a corporation of Delaware Application June 26, 1956, Serial No. 593,893

3 Claims. (Cl. 315—27)

The present invention relates to new and improved television deflection apparatus and, particularly, to circuitry suitable for use in producing horizontal deflection of an electron beam.

Conventional television receiver deflection apparatus is of the well known reaction scanning type in which a current wave is generally sawtooth shape is caused to flow through an electromagnetic winding associated with the cathode ray tube whose beam is to be deflected. Such flow is accomplished through the agency of a driver stage whose anode-cathode path is coupled suitably to the deflection winding. Specifically, one well known form of television receiver deflection circuit employs a driver or horizontal output tube whose anode-cathode current path includes a transformer winding to which the deflection winding is coupled. A driving waveform of generally sawtooth shape controls conduction of the driver tube so that anode conduction occurs therein during only a portion of the scanning part of the line deflection cycle. At the conclusion of the scanning part of the cycle, the drive waveform causes the driver tube to cut off, with the result that the deflection winding and associated circuitry oscillate at a relatively high frequency, one-half cycle of such oscillation being sufficient to produce flyback or retrace of the electron beam to its initial position for the next line scanning operation.

The high frequency oscillation which produces retrace would, if unimpeded, continue until the energy stored in the deflection circuitry was exhausted. In accordance with conventional practice, however, the oscillation is damped at the end of its first half cycle by means of a damper tube such as a diode suitably connected in relation to the deflection winding as to be rendered conductive by the oscillation. Such conduction of the damper tube effects, as is known, approximately half of the forward deflection of the beam in its line scanning movement, so that the entire line scan is attributable to the action of both the damper tube and the driver tube.

Since, as has been stated, the driver tube is responsible for the latter portion of the line scanning cycle, efficient deflection requires heavy current conduction through the driver tube, particularly toward the end of the line scan. It has been found, however, that the amplitude and shape of the waveform applied to the driver tube for controlling its conduction in the desired manner, together with the operating voltages applied to the various electrodes of the tube, result in conditions which tend to produce extremely high frequency oscillations of the order of 60 mcs. per second or more of the Barkhausen variety, which oscillations result in radiation of energy of that frequency. These radiations are introduced into the radio frequency (R. F) stages of the receiver and appear in the reproduced picture as high frequency disturbances termed "snivets." Since, as will appear more fully hereinafter, the Barkhausen type oscillations normally occur during the interval of peak conduction of the driver tube, the snivet disturbances appear in the right-hand side of the television raster.

It is, therefore, an object of the present invention to provide new and improved horizontal deflection apparatus in which the tendency for Barkhausen type oscillations and resultant snivets is substantially reduced.

As will be more fully explained hereinafter, the drive waveform applied to the control grid electrode of a conventional horizontal driver tube is coupled to the electrode via a capacitor-grid leak resistor combination of such character as to establish a negative bias between the control grid and cathode of the driver tube through grid current conduction during the more positive portion of the drive waveform. That is, the positive going peaks of the drive wave are "clipped" by the diode action of the driver tube grid and cathode. In an effort to produce maximum anode conduction of the driver tube during the latter portion of its operating cycle, television receivers have been designed so that the driver tube is caused to operate along the zero bias line of its $E_p$—$I_p$ curves for approximately 15% of the scanning time. That is, an appreciable portion of the drive wave at its positive extremity is clipped for the purpose of establishing the requisite grid-cathode bias for the tube.

In accordance with the present invention, means are provided for applying to the grid-cathode circuit of the driver tube an external negative operating bias of sufficient value to permit operation of the driver tube with less grid current. According to a specific form of the invention, the bias thus applied to the driver tube is derived from a source which varies the amount of the applied negative bias in accordance with the amplitude of the drive waveform, so that, despite variations in drive waveform amplitude, the applied or external bias tracks the waveform amplitude in such manner as to maintain the proper bias for the operation of the driver tube.

As will become more fully apparent, operation in accordance with the present invention is substantially as efficient as that obtainable with prior art arrangements but is, in addition, substantially free of the described Barkhausen type oscillations. Moreover, the present invention materially reduces the plate dissipation of the driver tube.

Additional objects and advantages of the present invention will become apparent to those skilled in the art from a study of the following detailed description of the accompanying drawing, in which.

Figure 1:
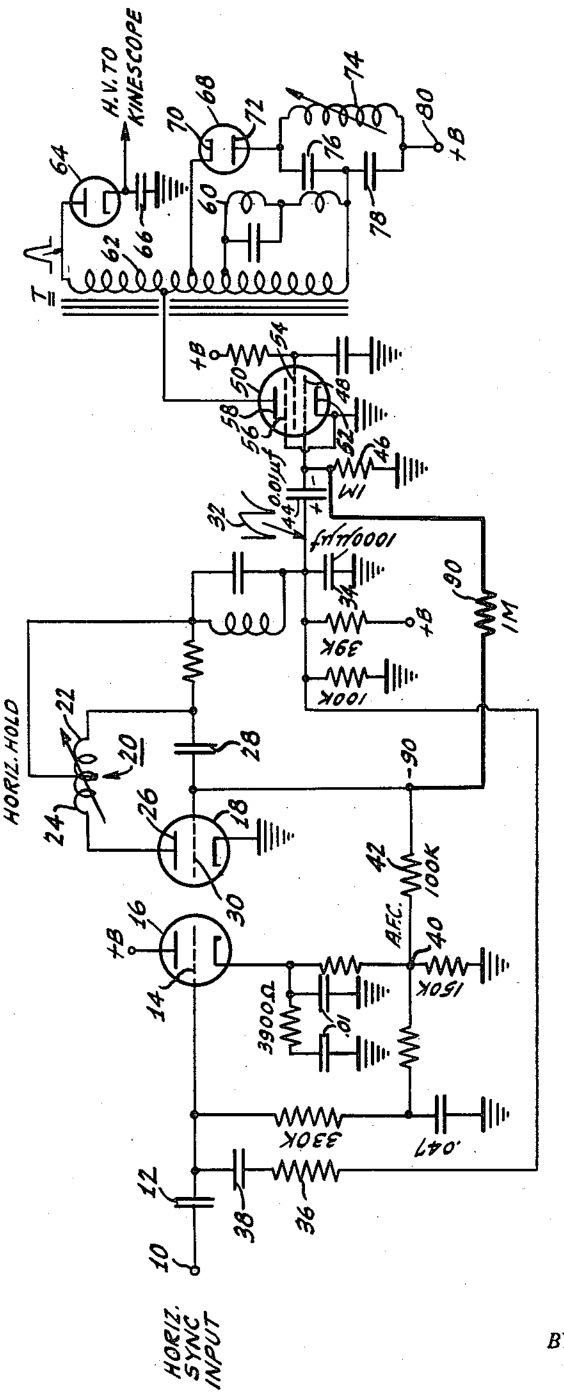
Figure 1 is a schematic diagram of a television horizontal output circuit in accordance with a specific form of the invention.

Referring to the drawing and, particularly, to Figure 1 thereof, there is illustrated the horizontal deflection circuitry of a television receiver embodying the present invention. Since, in the form of the invention illustrated, the change in or addition to conventional circuitry is relatively simple, the diagram of Figure 1 will first be described in connection with its overall operation.

Horizontal deflection synchronizing pulses are applied to the input terminal 10 of the system as from the usual sync pulse separator circuit of a television receiver. Such circuits are well known in the art and need not be described in detail here. The horizontal sync pulses are applied via a coupling capacitor 12 to the control grid 14 of a horizontal deflection AFC (automatic frequency control) tube 16, the purpose of which will be described in greater detail hereinafter but which will be understood as serving to control the frequency of the horizontal deflection waveform oscillator 18.

The oscillator 18 is connected as a conventional blocking oscillator including an inductance 20 which may be regarded as an autotransformer having a primary or grid section 22 and a secondary or anode section 24. The anode section 24 is connected to the anode 26 of the oscillator tube 18, while the grid section 22 of the inductance 20 is connected through a blocking capacitor 28 to the control grid electrode 30 of the oscillator tube. By virtue of the fact that oscillator circuits of the illustrated kind are conventional in nature, it is sufficient to note that the alternate charging and discharging of the blocking capacitor 28 results in the production of a generally sawtooth waveform such as that illustrated by the wave 32 at the upper plate of the output capacitor 34. A portion of the output wave is additionally coupled via a resistor 36 and capacitor 38 to the control grid 14 of the AFC tube 16 which serves to produce at its output terminal 40 a negative direct current voltage which varies in amplitude in such manner as to maintain the proper frequency and phase of operation of the oscillator tube 18. That is to say, the voltage at the terminal 40 is one which becomes more negative when the oscillations produced by the tube 18 speed up undesirably, thereby to slow down the frequency of oscillation. Conversely, the control voltage at the terminal 40 becomes less negative when it is necessary, as determined by the sawtooth waves and sync pulses applied to the grid 14, to decrease the oscillation frequency. This control voltage is applied to the grid 30 of the oscillator tube and, therefore, the blocking capacitor 28 via a resistor 42. This form of oscillator and AFC circuit is known as a "synchro-guide" arrangement and is described in greater detail in U. S. Patent No. 2,698,903, granted January 4, 1955, to S. I. Tourshou.

The output wave 32 of the blocking oscillator 18 is applied via a coupling capacitor 44 and grid leak resistor 46 to the control grid 48 of the horizontal output or driver tube 50 which further includes, as shown, a cathode 52 connected to a point of reference potential, a screen grid 54, suppressor grid 56 and anode 58. The anode of the driver tube is connected to a point on a horizontal output transformer T across which is connected the electromagnetic horizontal deflection winding 60 of the kinescope deflection yoke. A tertiary or step-up winding 62 of the transformer serves, in a conventional manner, to step up the periodic flyback pulses which appear across the transformer during horizontal retrace intervals of the scanning cycle, which pulses are rectified by a diode 64 to produce a high positive voltage across a filter capacitor 66 for application to the final anode of the kinescope. The horizontal deflection circuit further includes a damper tube 68 whose cathode 70 is connected to a point on the transformer T and whose anode 72 is connected through a generally conventional linearity circuit including a variable inductance 74 and serially connected capacitors 76 and 78 to a source of positive operating potential (+B) at the terminal 80. As will be recognized, the capacitors 76 and 78 serve to produce the "B-boost" voltage for the deflection circuit. Since the operation of the circuitry as described thus far is generally conventional in nature, no further description thereof is required herein.

Insofar as the operation of the horizontal output or driver tube 50 is concerned, however, a more detailed description is furnished for complete understanding of the present invention. The input drive waveform 32 indicated in Figure 1 as applied to the control grid of the driver tube is shown in enlarged form by waveform (*a*) of Figure 2. Since, in the usual operation of horizontal output tubes of the type in question, the tube is intended to be conducting during only the latter portion of the line scanning cycle, the drive waveform is of such configuration as to cut off anode conduction of the driver tube during the first portion of the scanning cycle. In order that the various portions of the drive waveform 32 may be correlated with the several parts of the line scanning cycle, Figure 2 indicates the scanning or "trace" period of the cycle by the time $T_S$, the retrace or flyback interval being indicated by the time $T_R$. Thus, the entire line scanning period $T_H$ is the sum of the times $T_S$ and $T_R$. It is further conventional practice to select values for the coupling capacitor 44 and grid leak resistor 46 such that the positive peaks of the input drive wave 32 are clipped so as to establish a bias for the input wave of such value that the wave is substantially clamped to zero voltage level indicated by the dotted line 84. Such bias is, as will be understood, produced by grid-cathode rectification in the driver tube of the positive peaks of the input wave, in that the resultant grid current through the grid leak resistor 46 produces the requisite negative voltage at the control grid electrode through charging of the coupling capacitor 44. Thus, it will be appreciated that the level of bias established for the control grid 48 is a function of the amount of grid current drawn by the driver tube 50.

With the drive waveform 32 clamped in the manner described, the driver tube 50 is driven into anode current cutoff by that portion of the drive wave below the cutoff voltage (indicated in the drawing by way of example as −40 volts) and remains cut off during the interval "A." It will be understood that, during interval "A," the damper tube 68 conducts to produce the first portion of the scanning deflection current through the winding 60. At the end of interval "A" when the drive waveform becomes more positive than the cutoff level, the driver tube 50 is rendered conductive and becomes more increasingly conductive during the remainder of the trace portion (interval "B" plus interval "C"). At the end of interval "C," the drive wave 32 again cuts off conduction in the driver tube 50, as shown by the sharply decreasing portion of the wave occurring during interval "D." Such sudden cessation of current through the driver tube produces a collapse in the flux associated with the deflection winding and transformer to produce a high positive voltage pulse across the transformer, which pulse is indicated by reference numeral 86 in waveform (*b*) of Figure 2. As an indication of the magnitude of the pulse 86, it may be noted that the pulse may be of the order of 6000 volts peak to peak. It is also during the retrace interval $T_R$ that the windings and distributed capacities of the deflection circuit commence a high frequency oscillation of the order of 70 kc. s., which oscillation results in rapid retrace of the beam in the kinescope. After one-half cycle of such oscillation, the damper tube 68 is rendered conductive to damp the oscillation. Such conduction of the damper tube results in the scanning deflection of the beam during the first portion of the period $T_S$ (approximately period "A").

Figure 2:
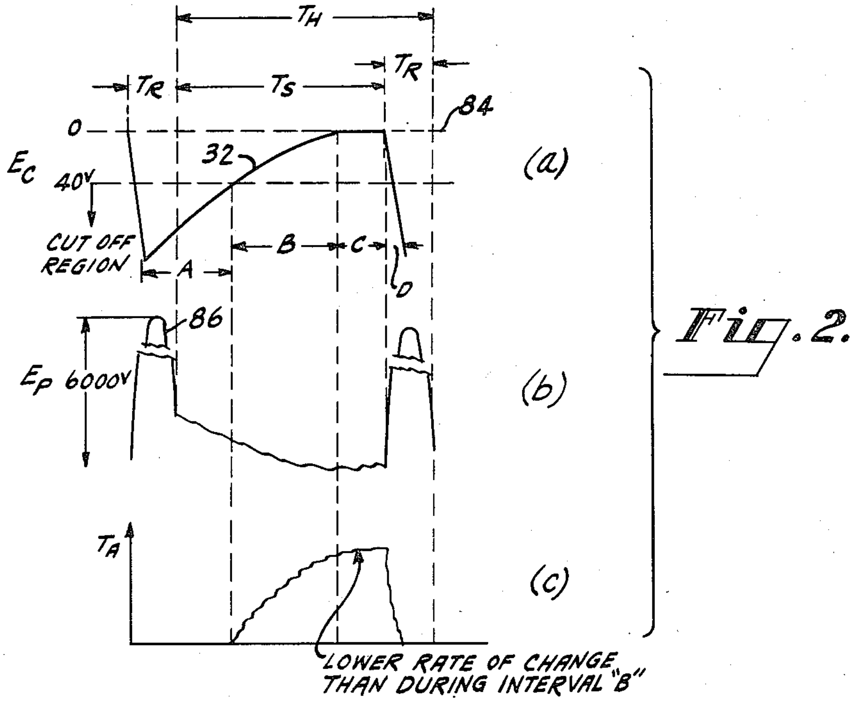
Figure 2 illustrates a series of waveforms to be described in connection with the circuit of Figure 1.

Since a comprehension of the action of the present invention requires an understanding of the anode voltage and current of the driver tube, the anode voltage $E_p$ of that tube is represented by waveform (*b*) of Figure 2, while the anode current wave of the drive tube is shown by waveform (*c*) of that figure. From the waveforms of Figure 2, it may be seen that the anode voltage of the driver tube is not actually constant between flyback pulses but, rather, decreases gradually during a portion of the period "A" and the period "B." The reason for the change in anode voltage of the driver tube is that the current through the deflection system has a sawtooth component because of the resistive component of the system's impedance. It will also be seen from Figure 2 that anode current conduction through the driver tube occurs substantially only through the intervals "B" and "C" and decreases rapidly during interval "D." That is, at the end of the scanning period $T_S$, when the driver tube 50 is cut off by the negativegoing portion of the drive wave 32, the anode voltage $E_p$ of the tube increases at an extremely high rate, while anode current $I_a$ also tends to decrease at a high rate.

Figure 3:
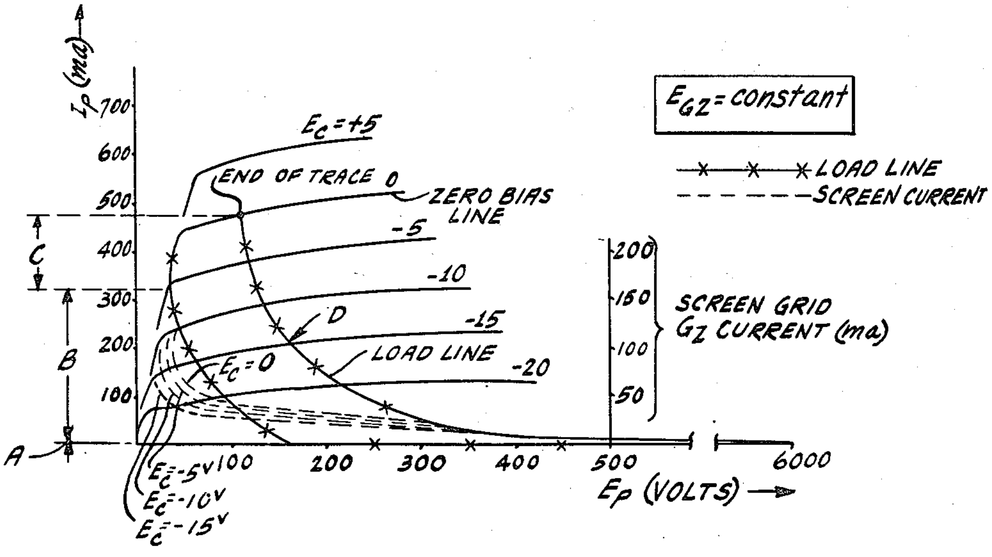
Figure 3 is illustrative of certain anode voltage and current relationships to be described.

The relationship of anode voltage, anode current and grid bias ($E_c$) may be better described in connection with Figure 3 which illustrates the "load line" for the horizontal driver tube. Since the load impedance for the driver tube is a complex one, as opposed to a simple resistive load, the load line is also complex. In Figure 3, anode voltage $E_p$ is plotted along the abscissa, while anode current $I_p$ is plotted along the ordinate axis, the various curves being indicative of several values of control grid bias ($E_c$) for constant screen grid voltage ($E_{g2}$). As stated above, interval "A" encompasses the time during which the driver tube is maintained in its cutoff condition. During this interval, therefore, anode current is zero, while the anode voltage extends to an extremely high value of the order of 6000 volts. Thus, the load line during interval "A," as shown in Figure 3, has no amplitude along the ordinate axis.

During interval "B," the output tube is rendered conductive by the grid drive waveform 32, so that anode current increases, while anode voltage decreases, as indicated by that portion of the load line between levels along the ordinate axis indicated by the letter "B." As indicated further, the load line is of such curvature that, at the end of interval "B" (i. e., at approximately the instant the driver tube reaches the zero bias level), the rate of change of anode current through the driver tube load starts to decrease, because of the flattening of the grid drive wave which results from the clipping action of the grid-cathode circuit of the drive tube. Hence, the instantaneous voltage across the load of the driver tube (which is proportional to $$L\frac{di}{dt})$$

decreases, increasing the anode voltage of the driver tube, which is equal to the difference between the boosted B voltage and the voltage drop across the load. By reason of these conditions, the anode voltage and current of the driver tube have no course to follow (in view of the fixed control grid bias and screen grid voltage) except the zero bias load line shown in Figure 3, so that anode voltage of the driver tube necessarily increases, producing a gradual increase in the tube's anode current.

At the end of the trace interval (end of period "C"), the driver tube is cut off by the negative-going portion of the drive wave so that anode voltage increases rapidly, while anode current tends to decrease. This relationship of voltage and current is represented by the generally exponentially curved portion "D" of the load line in Figure 3.

It has been found that an electron tube such as the horizontal driver tube 50 is susceptible to oscillations of the Barkhausen type of the order of 60 mcs. and higher during that portion of its operation cycle in which it is operating along its zero bias line. These conditions, as may be seen from Figure 3, are that anode voltage is at or near its minimum value for the cycle, while the emission of electrons from the cathode is at or near its maximum value (by reason of the minimum grid-cathode bias), the screen grid current also being at or near its maximum value during this time. Thus, electrons passing through the screen grid "see" a relatively low positive potential at the anode and are repelled thereby, some of the electrons thus repelled passing back through the screen grid toward the control grid whose even lower positive potential repels the electrons toward the screen. Such successive repulsion of electrons between the control grid and anode constitute the oscillations in question. These oscillations have further been found to radiate energy in the form of electromagnetic waves, which energy is introduced into the tuner portion of the receiver and is carried through the radio frequency, intermediate frequency, video detector and video amplifier stages to the kinescope's conduction controlling electrode in such manner that the electron beam of the kinescope is intensity modulated. Hence, the oscillations manifest themselves as vertical black stripes near the right-hand side of the picture on the kinescope screen, which stripes may be stationary, as when the B+ supply for the receiver is well filtered, or as moving lines when the B+ supply is not well filtered. These disturbances are termed snivets and are objectionable. It is, therefore, an object of the invention to provide means for eliminating or at least reducing such snivets.

Referring again to Figure 3, it may be noted that, at the time the driver tube reaches that point in its operation when it is on the zero bias curve, the anode voltage and current are very little different from the voltage and current which would prevail if the tube were operating on its −5 volts bias curve. It is significant, however, to note that the screen grid current is appreciably lower for the −5 volts bias condition than for the zero bias condition. It is known, moreover, that, with given values for anode voltage and current and screen grid voltage, the tendency for the tube to produce Barkhausen type oscillations is less with lower values of screen grid current.

By way of recapitulation of the foregoing, it has been noted that, in the conventional operation of television receiver horizontal deflection circuits, a certain value of anode current is required for given performance. In fact, it has been conventional, in order for such values of anode current to be realized, to operate the horizontal driver tube in such manner that its control grid bias is at or slightly above zero for approximately 15% of the scanning interval, during which time, as explained, the driver tube is susceptible to the undesirable oscillations. In accordance with the present invention, therefore, the control grid drive or the driver tube is changed from that described above to one in which control grid bias is kept at a more negative value than zero for a longer time, so that the tube reaches its zero bias condition later in the scanning cycle, thereby decreasing the tendency of the tube to oscillate.

In accordance with a specific form of the present invention, means are provided for applying to the control grid of the horizontal driver tube a certain amount of external negative bias, so that the amount of bias voltage which must be produced by grid current rectification in the driver tube is proportionately decreased. Thus, there is shown in Figure 1 means for applying to the control grid 48 of the driver tube 50 a negative bias voltage, such means comprising the resistor 90 connected between the control grid 30 of the horizontal deflection oscillator tube 18 and the driver tube grid 48. Since the oscillator tube 18 draws grid current during a portion of its cycle, there is produced across its grid resistors a negative direct current voltage. This negative voltage may, for example, be of the order of 90 volts. Thus, by suitably proportioning the resistor 90 with respect to the grid leak resistor 46 of the driver tube, the voltage applied from the oscillator grid 30 to the driver tube grid may be divided down to the desired value, such as −45 volts. Since the control grid bias of the driver tube is, according to the invention, determined by both the external bias and grid current flow of the driver tube, the same grid-cathode bias can be obtained with a smaller current flow through the grid leak resistor 46 than in the absence of the external bias. Stated otherwise, the amount by which grid of the driver tube must conduct in order for the proper bias to be established is less in accordance with the invention, so that the amount which the grid circuit must clip the drive waveform is correspondingly decreased. The effect of the reduced amount of clipping of the drive waveform 32 is that the drive wave causes the tube to operate along its zero bias curve for a shorter time than the 15% mentioned above. By way of example, the amount of clipping required in a circuit embodying the present invention was reduced from 15% of the scanned time to approximately 3%, with no decrease in deflection amplitude but with the resultant elimination of snivet-producing oscillations.

Viewed in another manner, since the driver tube is operated according to the present invention with a higher grid bias, the screen grid current is also lower, as indicated by the dotted curves in Figure 3, so that it is possible to employ a higher screen grid voltage for the same amount of screen grid power consumption. Such operation is advantageous in that a given amplitude of instantaneous anode current may be obtained with a lower anode voltage, so that anode dissipation is also lower.

Further in accordance with the present invention, it will be noted that the source of external bias for the horizontal driver tube is one which varies in accordance with the amplitude of the drive waveform. That is, the external bias, rather than being derived from a fixed source such as a battery, is derived from the horizontal oscillator and AFC circuit, so that the voltage actually applied to the driver tube control grid via the resistor 90 becomes more negative with increasing amplitude of the drive waveform 32 and less negative with decreasing amplitude of the drive waveform. Thus, it will be understood that, despite variations in drive, the bias applied to the driver tube tracks the drive waveform, so that the driver tube is caused to operate along its zero bias characteristic curve during the requisite portion of its operating cycle.

It will further be appreciated that, in accordance with the invention, the application of an external bias to the driver tube does not involve any requirement for an additional fixed negative voltage source, which source is not ordinarily available in conventional television receivers. Instead, the applied bias is derived from a circuit in which the voltage is readily available.

Having thus described my invention, what I claim as new and desire to secure by Letters Patent is:

1. A horizontal deflection amplifier for use in a television receiver, which amplifier comprises: an electron tube having a cathode, control grid, screen grid and anode; means connecting said tube as an amplifier, said means including a reactive load circuit connected between said anode and a source of positive operating voltage, means for applying a positive operating voltage to said screen grid and means connecting said cathode to a point of reference potential; a source of sawtooth voltage waveforms; means including a coupling capacitor connected between said saw tooth waveform source and said control grid and a grid leak resistor connected between said control grid and a point of fixed potential for applying waveforms from said source to said control grid to control current conduction of said tube, said operating voltages being so proportioned and said waveform being of such amplitude as to drive said tube beyond cut-off for a substantial portion of a horizontal scanning interval and thereafter to increase anode grid conduction through said tube such that said tube operates, for a latter portion of the scanning interval, in its region of control grid current conduction, during which time the voltage at said anode decreases to a value substantially below that of said screen grid, such that said tube is susceptible to undesirable high frequency oscillations, said capacitor and resistor being so proportioned as to develop a self-bias for said control grid from such control grid current conduction of said amplifier tube; and means for applying to said control grid a negative direct current bias voltage, whereby the self-bias required to be developed by said tube is reduced to such a point that the time in which said tube draws control grid current is substantially reduced, thereby to minimize the tendency of said tube to such undesired oscillations.

2. A horizontal deflection amplifier for use in a television receiver, which amplifier comprises: an electron tube having a cathode, control grid, screen grid and anode; means connecting said tube as an amplifier, said means including a reactive load circuit connected between said anode and a source of positive operating voltage, means for applying a positive operating voltage to said screen grid and means connecting said cathode to a point of reference potential; a source of sawtooth voltage waveforms; means including a coupling capacitor connected between said sawtooth waveform source and said control grid and a grid leak resistor connected between said control grid and a point of fixed potential for applying waveforms from said source to said control grid to control current conduction of said tube, said operating voltages being so proportioned and said waveform being of such amplitude as to drive said tube beyond cut-off for a substantial portion of a horizontal scanning interval and thereafter to increase anode grid conduction through said tube such that said tube operates, for a latter portion of the scanning interval, in its region of control grid current conduction, during which time the voltage at said anode decreases to a value substantially below that of said screen grid, such that said tube is susceptible to undesirable high frequency oscillations, said capacitor and resistor being so proportioned as to develop a self-bias for said control grid from such control grid current conduction of said amplifier tube; a source of negative direct current bias voltage which varies in amplitude in proportion to the amplitude of such sawtooth waveforms; and means for applying to said control grid a negative direct current bias voltage from said last-named source, whereby the self-bias required to be developed by said tube is reduced to such a point that the time in which said tube draws control grid current is substantially reduced, thereby to minimize the tendency of said tube to such undesired oscillations.

3. A horizontal deflection amplifier for use in a television receiver in which horizontal deflection driving waveforms are produced by an oscillator of the type which draws grid current so as to establish a negative voltage whose amplitude is proportional to the amplitude of its output waveforms, which amplifier comprises: an electron tube having a cathode, control grid, screen grid and anode; means connecting said tube as an amplifier, said means including a reactive load circuit connected between said anode and a source of positive operating voltage, means for applying a positive operating voltage to said screen grid and means connecting said cathode to a point of reference potential; means including a coupling capacitor connected between said oscillator and said control grid and a grid leak resistor connected between said control grid and a point of fixed potential for applying such oscillator output waveforms to said control grid to control current conduction of said tube, said operating voltages being so proportioned and said waveform being of such amplitude as to drive said tube beyond cut-off for a substantial portion of a horizontal scanning interval and thereafter to increase anode grid conduction through said tube such that said tube operates, for a latter portion of the scanning interval, in its region of control grid current conduction, during which time the voltage at said anode decreases to a value substantially below that of said screen grid, such that said tube is susceptible to undesirable high frequency oscillations, said capacitor and resistor being so proportioned as to develop a self-bias for said control grid from such control grid current conduction of said amplifier tube; and means connected between said oscillator and said control grid for applying to said control grid such negative direct current voltage to establish a negative control grid-to-cathode bias for said amplifier tube, whereby the self-bias required to be developed by said tube is reduced to such a point that the time in which said tube draws control grid current is substantially reduced, thereby to minimize the tendency of said tube to such undesired oscillations.

References Cited in the file of this patent

UNITED STATES PATENTS

| | | |
|---|---|---|
| 2,622,228 | Jones | Dec. 16, 1952 |
| 2,633,555 | Tourshou | Mar. 31, 1953 |
| 2,664,521 | Schlesinger | Dec. 29, 1953 |
| 2,685,033 | Volz | July 27, 1954 |